(12) United States Patent
Bachmat

(10) Patent No.: US 7,139,872 B1
(45) Date of Patent: Nov. 21, 2006

(54) SYSTEM AND METHOD FOR ASSESSING THE EFFECTIVENESS OF A CACHE MEMORY OR PORTION THEREOF USING FIFO OR LRU USING CACHE UTILIZATION STATISTICS

(75) Inventor: Eitan Bachmat, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 08/833,410

(22) Filed: Apr. 4, 1997

(51) Int. Cl.
*G06F 12/14* (2006.01)

(52) U.S. Cl. .................................. 711/113
(58) Field of Classification Search .............. 711/113, 711/136, 213, 118, 122, 144, 154, 159, 128
See application file for complete search history.

(56) References Cited

U.S. PATENT DOCUMENTS

| | | | | |
|---|---|---|---|---|
| 5,495,591 A | * | 2/1996 | Ryan | 395/421.03 |
| 5,566,315 A | * | 10/1996 | Milillo et al. | 711/113 |
| 5,590,308 A | * | 12/1996 | Shih | 711/136 |
| 5,761,715 A | * | 6/1998 | Takahashi | 711/128 |

OTHER PUBLICATIONS

A. K. Bhide et al "A simple analysis of the LRU buffer policy and its relationship to buffer warm-up transient" (IEEE, 1993).
D. Buck et al "An analytic study of caching in computer systems" (Academic Press, 1996).

* cited by examiner

Primary Examiner—Fred F. Tzeng
(74) Attorney, Agent, or Firm—Krishnendu Gupta; Penelope S. Wilson

(57) ABSTRACT

A system efficiently determines of the likely effectiveness of the cache memory for various cache memory sizes, based on a prediction of the likely cache miss rate, the prediction being based on operational statistics which are gathered during actual use of the cache memory over one or more time periods, and based on a variety of cache management methodologies. Based on the prediction, the operator or the system can facilitate increasing or decreasing the size of the cache memory, or maintaining the cache memory at its then-current size. The system determines the cache memory's read miss rate from statistics that are collected during use of the cache memory over an arbitrary time interval, including statistics concerning the file information retrieval activity and the extent of activity per unit time for system. Based on the statistics, equations, which are based on the respective cache memory management methodology, including the FIFO (first-in/first-out) methodology or the LRU (least-recently used) methodology, used in managing the cache memory, are solved to generate a prediction of the cache miss rate for a particular cache memory size, which may be larger or smaller than the current cache memory size, and for the particular cache memory management methodology. The system can repeat this a number of times over respective time intervals to determine corresponding predictions based on the cache memory utilization for respective sets of statistics determined during each time interval. Thereafter, the system or an operator can effect a change in the cache memory size based on the cache miss rate predictions.

24 Claims, 3 Drawing Sheets

SYSTEM AND METHOD FOR ASSESSING THE EFFECTIVENESS OF A CACHE MEMORY OR PORTION THEREOF USING FIFO OR LRU USING CACHE UTILIZATION STATISTICS

FIELD OF THE INVENTION

The invention relates generally to the field of digital data processing systems, and more particularly to a system and method for assessing the operational effectiveness of a cache memory in a digital data processing system. The cache memory operational effectiveness assessment can be used to determine whether increasing the size of a cache memory would provide any significant increase in processing efficiency by the digital data processing system, as well as whether any significant decrease in processing efficiency might occur if the size of the cache memory is decreased.

BACKGROUND OF THE INVENTION

Digital data processing systems include one or more processors for performing processing operations in connection with information stored in a memory. Typically, a memory in a modern digital data processing system consists of a hierarchy of storage elements, extending from large-capacity but relatively slow storage elements and various levels of lower-capacity and relatively fast storage devices. The large-capacity and relatively slow devices include such types of devices as disk or tape storage devices which store information on a magnetic medium; such devices are relatively inexpensive on a storage cost per unit of storage basis. Intermediate in the hierarchy, both in terms of speed and storage capacity are random-access memories, which are somewhat faster than the disk or tape devices, but which are also more expensive on a storage cost per unit of storage basis. At the fastest end of the hierarchy are cache memories, which are also the most expensive and thus generally the smallest.

Generally, during processing operations, a processor will enable information to be processed to be copied from the slower devices to the increasingly faster devices for faster retrieval. Generally, transfers between, for example, disk devices and random-access memories are in relatively large blocks, and transfers between the random-access memories and cache memories are in somewhat smaller "cache lines." In both cases, information is copies to the random-access memory and cache memory on an "as needed" basis, that is, when the processor determines that it needs particular information in its processing, it will enable blocks or cache lines which contain information to be copied to the respective next faster information storage level in the memory hierarchy. Certain prediction methodologies have been developed to attempt to predict the whether a processor will need information for processing before it (that is, the processor) actually needs the information, and to enable the information to be copied to the respective next faster information storage level. However, generally at some point in the processing operations, the processor will determine that information required for processing is not available in the faster information storage level, that is, a "read miss" will occur, and it (that is, the processor) will need to delay its processing operations until the information is available. Generally, the rate at which read misses will occur with storage element(s) at a particular level in the hierarchy will be related to the storage capacity of the storage element(s) at the particular level, as well as the pattern with which the processor accesses the information in the respective storage level. In any case, to enhance the processing efficiency of a digital data processing system, it is generally helpful to be able to assess the effect of changing the capacity of the memory element(s) at a particular level in the memory hierarchy on the rate of read misses at the particular level.

SUMMARY OF THE INVENTION

The invention provides a new and improved system and method for providing a prediction of the operational effectiveness of a cache memory of a particular size in a digital data processing system. The invention facilitates the efficient determination of the likely effectiveness of the cache memory for various cache memory sizes, based on a prediction of the likely cache miss rate, the prediction being based on operational statistics which are gathered during actual use of the cache memory over one or more time periods, and based on a variety of cache management methodologies. Based on the prediction, the operator or the system can facilitate increasing or decreasing the size of the cache memory, or maintaining the cache memory at its then-current size.

The system determines the cache memory's read miss rate from statistics that are collected during use of the cache memory over an arbitrary time interval, including statistics concerning the file information retrieval activity and the extent of activity per unit time for system. Based on the statistics, equations, which are based on the respective cache memory management methodology, including the FIFO (first-in/first-out) methodology or the LRU (least-recently used) methodology, used in managing the cache memory, are solved to generate a prediction of the cache miss rate for a particular cache memory size, which may be larger or smaller than the current cache memory size, and for the particular cache memory management methodology. The system can repeat this a number of times over respective time intervals to determine corresponding predictions based on the cache memory utilization for respective sets of statistics determined during each time interval. Thereafter, the system or an operator can effect a change in the cache memory size based on the cache miss rate predictions.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

The invention provides a new system 10 for generating an assessment as to the operational effectiveness of a cache memory operating in a digital data processing system. In an illustrative embodiment, the system 10 includes a suitably programmed digital computer system, which will be described in connection with FIG. 1. The computer system performs a number of processing operations, as will be described below in connection with the flow chart depicted in FIG. 3, in connection with operational statistics which are generated during operations in connection with a respective cache memory to generate the operational effectiveness assessment. An illustrative digital data processing system including a cache memory for which the cache assessment generating system 10 generates an operational assessment will be described in connection with FIG. 2.

Figure 1:
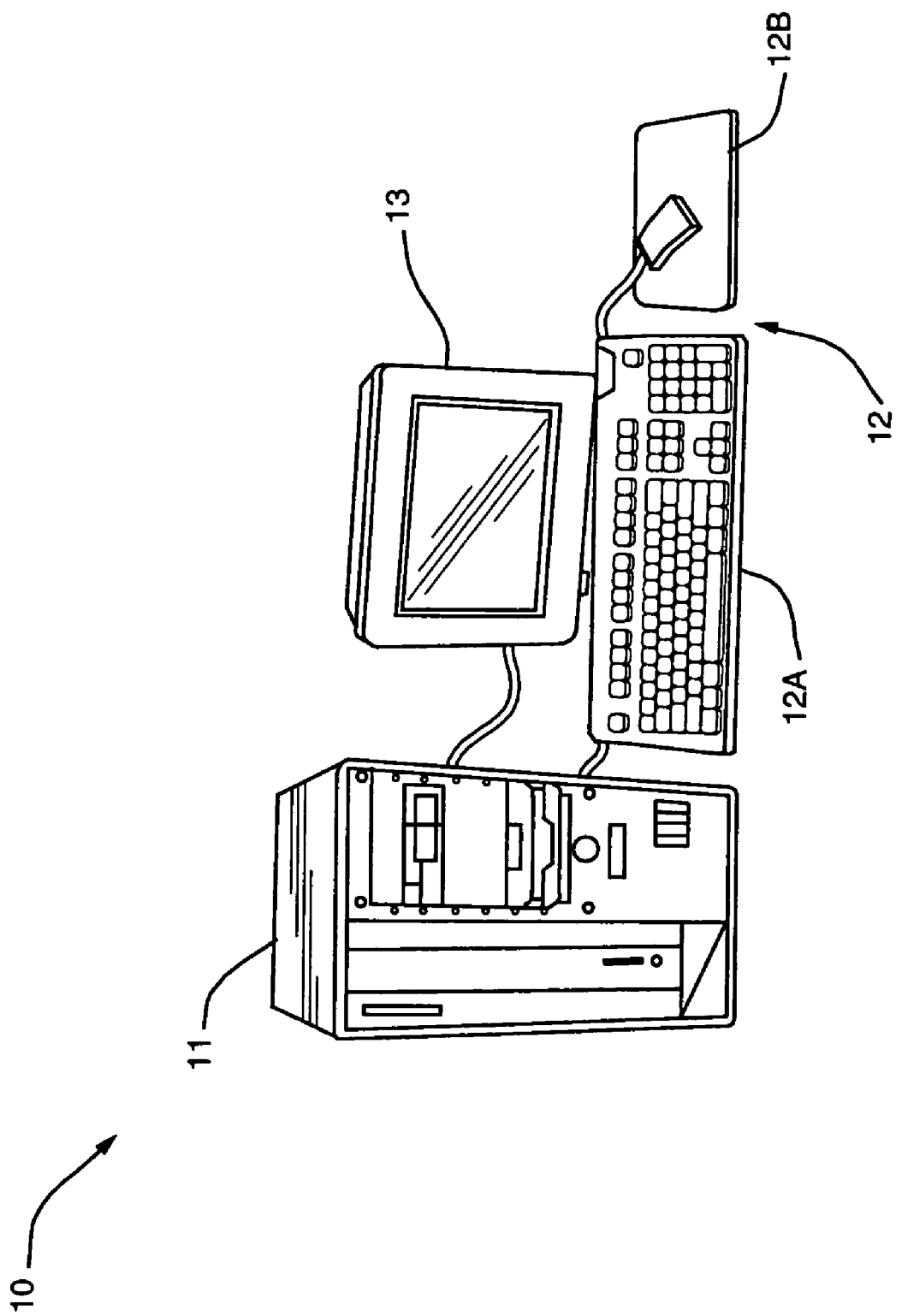
FIG. 1 is a functional diagram of a system for assessing the operational effectiveness of a cache memory in a digital data processing system.

With initial reference to FIG. 1, the cache assessment system 10 in one embodiment includes digital computer system including a processor module 11 and operator interface elements comprising operator input components such as a keyboard 12A and/or a mouse 12B (generally identified as operator input element(s) 12) and an operator output element such as a video display device 13. The illustrative computer system is of the conventional stored-program computer architecture. The processor module 11 includes, for example, processor, memory and mass storage devices such as disk and/or tape storage elements (not separately shown) which perform processing and storage operations in connection with digital data provided thereto. In addition, the processor module 11 can include one or more network ports which are connected to communication links which connect the computer system in a computer network. The network ports enable the computer system to transmit information to, and receive information from, other computer systems and other devices in the network. The operator input element(s) 12 are provided to permit an operator to input information for processing. The video display device 13 is provided to display output information generated by the processor module 11 on a screen to the operator, including data that the operator may input for processing, information that the operator may input to control processing, as well as information generated during processing. The processor module 11 generate information for display by the video display device 13, in one embodiment using a so-called "graphical user interface" ("GUI"). Although the computer system is shown as comprising particular components, such as the keyboard 12A and mouse 12B for receiving input information from an operator, and a video display device 13 for displaying output information to the operator, it will be appreciated that the computer system may include a variety of components in addition to or instead of those depicted in FIG. 1.

Figure 2:
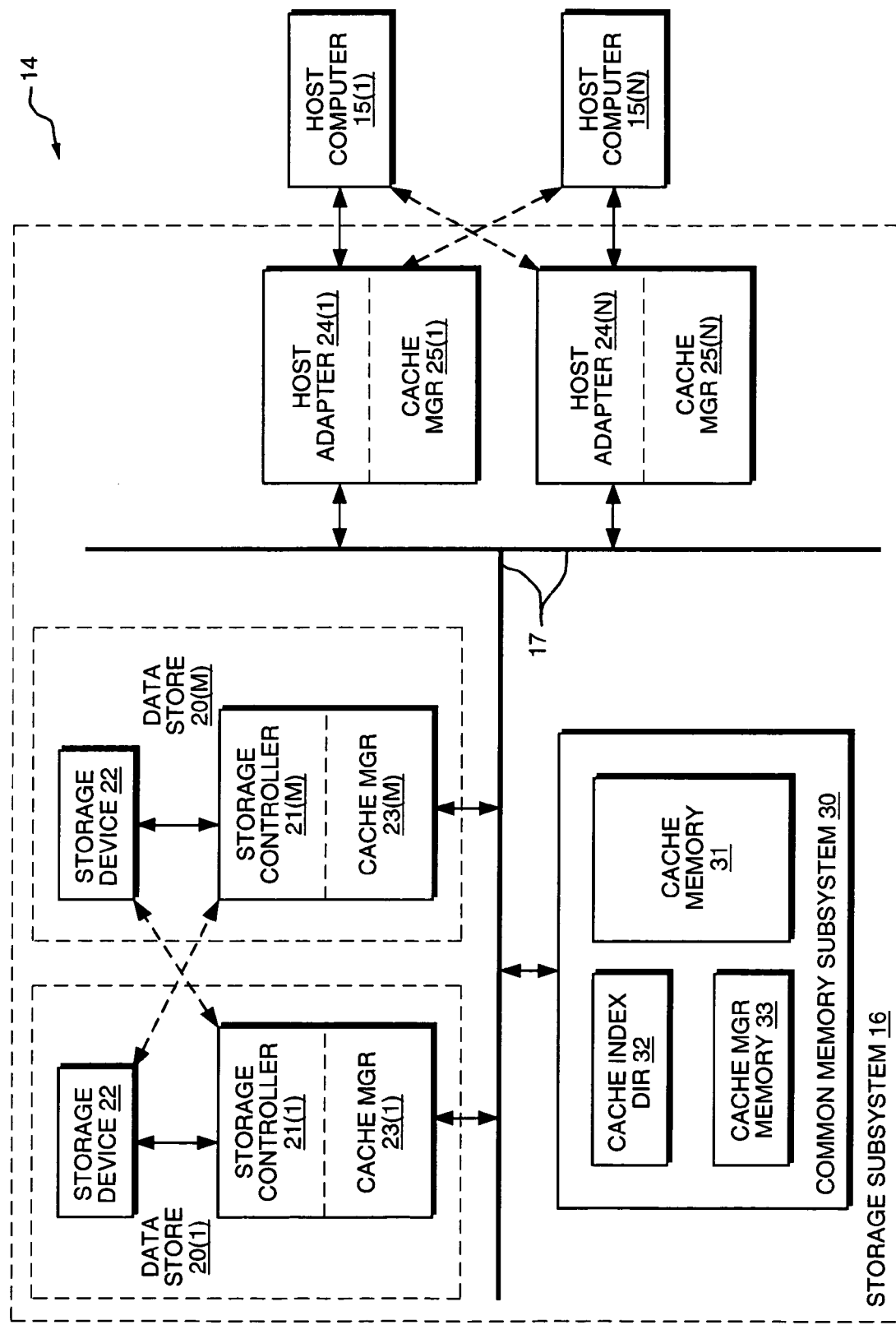
FIG. 2 is a functional block diagram of an illustrative digital data processing system with which the cache assessment system depicted in FIG. 1 can be used.

As noted above, the cache assessment system 10 constructed in accordance with the invention generates an assessment as to the operational effectiveness of a cache memory in a digital data processing system. An illustrative such digital data processing system 14 is depicted in FIG. 2. With reference to FIG. 2, digital data processing system 14 includes a plurality of host computers 15(1) through 15(N) (generally identified by reference numeral 15(n)) and a digital data storage subsystem 16 interconnected by a common bus 17. Each host computer 15(n) may comprise, for example, a personal computer, workstation, or the like which may be used by a single operator, or a multi-user computer system which may be used by a number of operators. Each host computer 15(n) is connected to an associated host adapter 24(n), which, in turn, is connected to bus 17. Each host computer 15(n) may control its associated host adapter 24(n) to perform a retrieval operation, in which the host adapter 24(n) initiates retrieval of computer programs and digital data (generally, "information") from the digital data storage subsystem 16 for use by the host computer 15(n) in its processing operations. In addition, the host computer 15(n) may control its associated host adapter 24(n) to perform a storage operation in which the host adapter 24(n) initiates storage of processed data in the digital data storage subsystem 16. Generally, retrieval operations and storage operations in connection with the digital data storage subsystem 16 will collectively be referred to as "access operations."

In connection with both retrieval and storage operations, the host adapter 15(n) will transfer access operation command information, together with processed data to be stored during a storage operation, over the bus 17. Access to the bus 17 is controlled by bus access control circuitry which, in one embodiment, is integrated in the respective host adapters 24(n). The bus access control circuitry arbitrates among devices connected to the bus 17 which require access to the bus 17. In controlling access to the bus 17, the bus access control circuitry may use any of a number of known bus access arbitration techniques.

The digital data storage subsystem 16 in one embodiment is generally similar to the digital data storage subsystem described in U.S. Pat. No. 5,206,939, entitled System And Method For Disk Mapping And Data Retrieval, issued Apr. 27, 1993 to Moshe Yanai, et al (hereinafter, "the '939 patent"). As shown in FIG. 2, the digital data storage subsystem 16 includes a plurality of digital data stores 20(1) through 20(M) (generally identified by reference numeral 20(m)), each of which is also connected to bus 17. Each of the data stores 20(m) stores information, including programs and data, which may be accessed by the host computers 15(n) for processing, as well as processed data provided to the digital data storage subsystem 16 by the host computers 15(n).

Each data store 20(m), in turn, includes a storage controller 21(m) and one or more storage devices generally identified by reference numeral 22. The storage devices 22 may comprise any of the conventional magnetic disk and tape storage devices, as well as optical disk storage devices and CD-ROM devices from which information may be retrieved. Each storage controller 21(m) connects to bus 17 and controls the storage of information which it receives thereover in the storage devices connected thereto. In addition, each storage controller 21(m) controls the retrieval of information from the storage devices 22 which are connected thereto for transmission over bus 17, and in one embodiment includes bus access control circuitry for controlling access to bus 17.

The digital data storage subsystem 16 also includes a common memory subsystem 30 for caching information during an access operation and event status information providing selected status information concerning the status of the host computers 15(n) and the data stores 20(m) at certain points in their operations. The caching of event status information by the common memory subsystem 30 is described in detail in U.S. patent application Ser. No. 08/532,240 filed Sep. 25, 1995, in the name of Eli Shagam, et al., and entitled Digital Computer System Including Common Event Log For Logging Event Information Generated By A Plurality of Devices assigned to the assignee of the present invention and incorporated herein by reference. The information cached by the common memory subsystem 30 during an access operation includes data provided by a host computer 15(n) to be stored on a data store 20(m) during a storage operation, as well as data provided by a data store 20(m) to be retrieved by a host computer 15(n) during a retrieval operation.

The common memory subsystem 30 effectively operates as a cache to cache information transferred between the host computers 15(*n*) and the data stores 20(*m*) during an access operation. The common memory subsystem 30 includes a cache memory 31, a cache index directory 32 and a cache manager 33, which are generally described in U.S. patent application Ser. No. 07/893,509 filed Jun. 4, 1995, in the name of Moshe Yanai, et al., entitled "System And Method For Dynamically Controlling Cache Management," and U.S. Pat. No. 5,592,432, entitled "Cache Management System Using Time Stamping For Replacement Queue," issued Jan. 7, 1997 in the name of Natan Vishlitzky, et al. both of which are assigned to the assignee of the present invention and incorporated herein by reference. The cache memory 31 operates as a buffer in connection with storage and retrieval operations, in particular buffering information received from the data stores 20(*m*) requested by the host computers 15(*n*) for processing, as well as information received from the host computers 15(*n*) to be transferred to the storage devices for storage.

In operation, when a host computer 15(*n*) wishes to retrieve information from the storage subsystem 16, it initially enables its host adapter 24(*n*), in particular a cache manager 25(*n*) associated with the host adapter 24(*n*), to determine whether the information to be retrieved is in the cache memory 31. If the information to be retrieved is in the cache memory 31, that is, if a "read hit" occurs in connection with the cache memory 31, the cache manager 25(*n*) will retrieve the information from the cache memory 31 and transfer it to the host computer 15(*n*). On the other hand, if the information to be retrieved is not in the cache memory 31, that is, if a "read miss" occurs in connection with the cache memory 31, the cache manager 25(*n*) will enable a cache manager 23(*m*) associated with the data store 20(*m*) whose storage device 22 which contains the information to be retrieved to perform a "staging operation" to transfer a portion of a file containing the information to be retrieved from the storage device 22 to the cache memory 31. After the portion of the file has been transferred from the storage device 22 to the cache memory 31 during the staging operation, the data store's cache manager 23(*m*) will notify the host adapter's cache manager 25(*n*), after which the host adapter's cache manager 25(*n*) can retrieve the information from the cache memory 31.

Similar operations are performed in connection with a storage operation, in which information in a file is updated. In particular, during a storage operation, the host adapter 24(*n*) will enable its cache manager 25(*n*) to initially determine whether at least the portion of the file to be updated is in the cache memory 31. If the portion of the file to be updated is in the cache memory, that is, if a "write hit" occurs in connection with the cache memory 31, the cache manager 25(*n*) will store the updated information in the cache memory 31. On the other hand, if the cache manager 25(*n*) determines that the portion of the file to be updated is not in the cache memory 31, that is, if a "write miss" occurs in connection with the cache memory 31, the cache manager 25(*n*) will enable the cache manager 23(*m*) associated with the data store 20(*m*) whose storage device 22 which contains the portion of the file to be updated to perform a "staging operation" to transfer the data from the storage device 22 to the cache memory 31. After the portion of the file has been transferred from the storage device 22 to the cache memory 31 during the staging operation, the data store's cache manager 23(*m*) will notify the host adapter's cache manager 25(*n*), after which the host adapter's cache manager 25(*n*) can store the updated information in the cache memory 31.

It will be appreciated that the efficiency of the digital data processing system 14 will generally be enhanced if the rate at which, in particular, read misses in connection with cache memory 31 can be reduced. The rate at which read misses occur is of importance, relative to write misses, since read misses can slow down the rate at which the host computers 15(*n*) will be able to obtain information for processing, whereas write misses will just slow down the rate at which updated information is stored in the storage subsystem 16. The cache assessment system 10 provides an assessment as to the effectiveness of the common memory subsystem 30 in operating as a cache, and in particular generates an assessment as to the changes in read misses which may occur if the cache memory 31 is increased or decreased in size.

The cache assessment system 10 determines the cache memory's read miss rate from statistics that are collected during operation of the digital data processing system 14, including statistics concerning the file information retrieval activity and the extent of activity per unit time for digital data processing system 14. The file access activity, which will be represented by $A_i$, measures the number of times the host computers 15(*n*) issued requests to retrieve information from the particular "i-th" file, including those retrieval requests for which the information was already in the cache memory 31 and those retrieval requests for which staging operations were required to transfer the information from the storage device 22 to the cache memory 31. The extent of activity, which will be represented by $E_i$, refers to the amount of the respective "i-th" file which is active. Both statistics $A_i$ and $E_i$ are gathered over an arbitrary time interval, and represent the activity and extent of activity over the particular time interval. Assuming that (a) the activity is spread uniformly over a particular extent, which can occur if the host computers 15(*n*) randomly issue retrieval requests for information from the respective extent;

(b) the digital data processing system 14 caches all read misses in cache memory 31, that is, during staging operations in connection with information from a file following determinations by the respective host adapters 24(*n*) that the information was not already in the cache memory 31; and (c) the cache memory 31 is managed on a first-in first-out (FIFO) basis, that is, information is removed from the cache in the order in which it is loaded into the cache (generally, if the cache memory 31 is large, other cache management methodologies, such as the "least-recently used" methodology, will approximate FIFO management)

then, if $P_i$ represents the percentage of the cache memory 31 which is occupied by information from a file "i," at each point in time the sum of the percentages of all of the files "i" that are stored in the storage devices 22 of storage subsystem 16 which are cached in the cache memory 31 equals one, that is, $$\sum_i P_i = 1. \tag{1}$$

Based on assumptions (b) and (c) above, that is, based on the assumption that the digital data processing system 14 caches all read misses in the cache memory 31, stores the staged information retrieved from a file stored on a storage device caches all of the read misses in the cache memory 31, and based further on the assumption that the cache memory 31 is managed on a FIFO basis, then the percentage of the "i-th" file that is cached in the cache memory 31 at any point in time corresponds to the ratio between the number of read misses in connection with the "i-th" file and the total number of read misses, that is, $$P_i = \frac{M_i}{M}, \quad (2)$$

where $M_i$ represents the number of read misses in connection with file "i" per unit time and "M" represents the total number of read misses which occur in the digital data processing system 14 per unit time. At any point in time, the portion of the "i-th" file which is cached in the cache memory 31 corresponds to $$\frac{P_i S}{E_i}$$

and so the portion of the file which is not cached in the cache memory 31 corresponds to $$1 - \frac{P_i S}{E_i}.$$

Based on assumption (a) above, that is, that activity rate $A_i$ in connection with a file is spread uniformly over the file, the number of read misses in connection with file "i" per unit time, $M_i$, in turn, is related to the portion of the file which is not in the cache memory 31 at any point in time, times the activity rate $A_i$, or $$M_i = \left(1 - \frac{P_i S}{E_i}\right) A_i. \quad (3)$$

Combining equations (2) and (3), the multiplicative product of the $P_i$, the percentage of the cache memory 31 which is occupied by information from the "i-th" file over each time interval, times the total number of read misses over the time interval corresponds to $$P_i M = M_i = \left(1 - \frac{P_i S}{E_i}\right) A_i. \quad (4)$$

Rearranging equation (4), $$P_i M + P_i \frac{S A_i}{E_i} = A_i \quad (5)$$

and solving equation (5) for $P_i$, $$P_i = \frac{A_i}{M + \frac{S A_i}{E_i}}. \quad (6)$$

Combining equation (6) and equation (1), $$1 = \sum_i P_i = \sum_i \frac{A_i}{M + \frac{S A_i}{E_i}} \quad (7)$$

which is a function of "M," the total number of read misses per time interval, the size "S" of the cache and the statistics $A_i$ and $E_i$ which are generated as described above.

Equation (7) effectively gives a prediction as to the number of read misses in connection with cache memory 31 as a function of the size "S" of the cache memory 31, for the particular types of processing operations which are performed by the digital data processing system 14 during the time interval over which the statistics $A_i$ and $E_i$ were collected. Accordingly, for any particular size "S" as selected by the operator of the cache assessment system 10, equation (7) can be solved for "M" to provide a prediction as to the effect on the number of read misses which would occur for the particular cache memory size S. That is, for any particular value of "S," the size of the cache memory 31, the number of read misses can be predicted by providing that value in equation (7) and solving for "M."

Equation (7) can be solved for "M" in a number of ways. Equation (7) can be efficiently solved for "M" using a binary search arrangement, as will be evident from the following. First, it will be recognized that, generally, the sum in the right-hand side of equation (7) is a function of "M" and "S," that is, $$f(M, S) = \sum_i \frac{A_i}{M + \frac{S A_i}{E_i}}. \quad (8)$$

is monotonically decreasing for positive values of "M" and "S." Differentiating equation (8) with respect to "M,"

$$f'(M, S) = \sum_i \frac{-A_i}{\left(M + \frac{S A_i}{E_i}\right)^2} \quad (9)$$

where f(M,S) represents the derivative of f(M,S) with respect to M. Since $A_i$, $E_i$, M and S are all positive numbers, it will be appreciated that the derivative is negative for all positive values of "M" and "S", and so f(M,S) as shown in equation (8) is monotonically decreasing for all values of "S." Thus, for each value of "S" there will be one real value for "M." In addition, it will be recognized that the value of "M" will fall in the interval $$0 \leq M \leq \sum_i A_i = A \quad (10)$$

(where "A" represents the total activity over the time interval), since the number of read misses in a time interval cannot be negative and cannot exceed the total activity over the time interval. Any conventional methodology can be used to determine or approximate the solution to equation (7), including, for example, a conventional binary search methodology over the interval defined by equation (10).

Using equations (7) and (10), an operator of the cache assessment system 10 can assess the effectiveness, if any, of increasing or decreasing the size of the cache memory 31 from its current size, based on the particular types of processing activities performed during the time interval over which the statistics $A_i$ and $E_i$ were collected. Using equations (7) and (10) over a plurality of time intervals, during which the mixture of types of processing operations will likely change, the operator can determine the effectiveness, if any, of increasing or decreasing the size of the cache memory 31 for the diverse mixtures of processing operations which the digital data processing apparatus 14 may be called upon to perform.

As noted above, the model described in connection with equations (1) through (9) encompasses assumptions (a) and (b) above, namely, that the activity in connection with an accessed file is spread uniformly over the respective file (assumption (a)), and that the digital data processing system 14 caches all read misses in cache memory 31 (assumption (b)). For at least information to be processed (in contrast to program instructions which may be stored in the storage subsystem 16 and retrieved by the host computers 15(n)), generally assumption (b) is correct, that is, generally such information retrieved from the storage devices in connection with a staging output following a read miss will be cached in the cache memory 31. However, activity in connection with an accessed file does not need to be uniformly distributed uniformly over the entire file, and so assumption (a) may not be correct.

To extend the methodology to a model in which assumption (a) is eliminated, it will be assumed that each file may comprise one or more relatively short, non-overlapping, and possibly variable-length "packets." When the an access request is issued to particular packet is referenced, the packet may be re-referenced within a relatively short period of time. As an illustration which will assist in clarifying these assumptions, in a file containing banking information for customers of a bank, each of the packets may comprise information concerning a particular account or customer. In that case, the packets may have differing lengths, based on the amount of banking the customer has done with the particular bank. In addition, typically the packets will be accessed when, for example, the customer's account is updated by the bank or when the customer calls for information concerning the account, and will otherwise not be accessed. In that case, when a packet is accessed, a number of references may be made to the packet within a short time, that is, while the bank is performing the update operation or during the call. In this extended methodology, the activity and extent statistics $A_i$ and $E_i$, are still determined on a file basis; however, a further statistic is generated, namely, a reference average $R_i$, which indicates the average number of times a packet is referenced during each time interval, that is, the number of times a host computer 15(n) retrieves information from the packet. (A methodology for determining the value of $R_i$ will be described below.) It will be appreciated that the reference average $R_i$ includes the initial reference, which would give rise to a cache miss. Under these assumptions, equation (4) becomes $$P_i M = M_i = \left[\left(1 - \frac{P_i S}{E_i}\right) + (R_i - 1 - H(i, S))\right]\frac{A_i}{R_i} \quad (11)$$

where H(i,S) corresponds to the number of cache hits per packet. (A methodology for determining the value of H(i,S) will be described below.) In equation 11, (a) the term $$\left(1 - \frac{P_i S}{E_i}\right)$$

as in equation (4), is an indication of the amount of the amount of the "i-th" file that is not in the cache, and so $$\left(1 - \frac{P_i S}{E_i}\right)\frac{A_i}{R_i}$$

is an indication of the number of cache misses on the first access request in connection with a packet; and (b) the term $$(R_i - 1 - H(i, S))\left(\frac{A_i}{R_i}\right)$$

is an indication of the number of cache misses on subsequent references in connection with a packet.

Rearranging equation (11) in the same manner as equation (4) above, $$P_i\left(M + \frac{S\left(\frac{A_i}{R_i}\right)}{E_i}\right) = \frac{A_i}{R_i}(R_i - 1 - H(i, S)) \quad (12)$$

and solving equation (12) for $P_i$, $$P_i = \frac{\frac{A_i}{R_i}(R_i - 1 - H(i, S))}{M + \frac{S\left(\frac{A_i}{R_i}\right)}{E_i}} \quad (13)$$

Since, as above in connection with equation (1), it is assumed that the cache memory 31 is fully populated with information from the data stores 20(m), $$1 = \sum_i P_i = \sum_i \frac{\frac{A_i}{R_i}(R_i - 1 - H(i, S))}{M + \frac{S\left(\frac{A_i}{R_i}\right)}{E_i}}, \quad (14)$$

which, as in equation (7), provides the cache miss ratio "M" as a function of the cache size "S" and the statistics developed over the time interval.

Using a methodology similar to that described above in connection with equation (7), equation 14 can be solved in the following manner. From the following, it will be clear that equation (14) provides one real solution of "M" for each value of "S." First, it will be recognized that, generally, the sum in the right-hand side of equation (14) is a function of "M" and "S," that is, $$f(M, S) = \sum_i \frac{\frac{A_i}{R_i}(R_i - 1 - H(i, S))}{M + \frac{S\left(\frac{A_i}{R_i}\right)}{E_i}}. \quad (15)$$

is monotonically decreasing for positive values of "M" and "S." Differentiating equation (15) with respect to "M,"

$$f'(M, S) = \sum_i \frac{-\frac{A_i}{R_i}(R_i - 1 - H(i, S))}{\left(M + S\frac{\left(\frac{A_i}{R_i}\right)}{E_i}\right)^2} \quad (16)$$

where f(M,S) represents the derivative of f(M,S) with respect to M. Since $A_i$, $E_i$, M and S are all positive numbers, it will be appreciated that the derivative is negative for all positive values of "M" and "S", and so f(M,S) as shown in equation (8) is monotonically decreasing for all values of "S." Thus, for each value of "S" there will be one real value for "M." In addition, it will be recognized that the value of "M" will fall in the interval $$0 \le M \le \sum_i A_i = A \quad (17)$$

(where "A" represents the total activity over the time interval), since the number of read misses in a time interval cannot be negative and cannot exceed the total activity over the time interval. Any conventional methodology can be used to determine or approximate the solution to equation (14), including, for example, a conventional binary search methodology over the interval defined by equation (17).

Using equations (14) and (17), an operator of the cache assessment system 10 can assess the effectiveness, if any, of increasing or decreasing the size of the cache memory 31 from its current size, based on the particular types of processing activities performed during the time interval over which the statistics $A_i$ and $E_i$ were collected. Using equations (14) and (17) over a plurality of time intervals, during which the mixture of types of processing operations will likely change, the operator can determine the effectiveness, if any, of increasing or decreasing the size of the cache memory 31 for the diverse mixtures of processing operations which the digital data processing apparatus 14 may be called upon to perform.

As noted above, the methodologies described above in connection with equations 1 through 10 and 11 through 17 both assume that the cache memory 31 is operated using a FIFO cache operating methodology (assumption (c) above). While the FIFO methodology can be useful in approximating conditions in cache memories which use other methodologies, particualrly if the cache memories are relatively large, a more accurate methodology for use with a cache memory which is operated using the "LRU" (least recently used) cache management methodology, will be described in connection with equations (18) through (21) below. As is usual in the LRU cache management methodology, when a cache miss occurs and information is staged into the cache memory 31, the information that is replaced during the staging operation is the information that was least recently accessed by, for example, a host adapter 24(n). To maintain the LRU ordering, when information in the cache memory 31 is accessed, the accessed information's position in the LRU ordering is promoted to the top of the LRU ordering. Thus, since a time interval "I," there are M/I cache slots in the cache memory 31 replaced during the time interval, the amount of time that an extent will remain in the cache memory 31 after the last time the extent was referenced will correspond to the total size of the cache memory 31, "S," divided by the number of cache slots that are replaced duirng a time interval "M/I." That is, the amount of time that an extent will remain i the cache memory 31 after it was last reference corresponds to S/(M/I). Accordingly, if the the time interval between the first time the extent is accessed and the last time the extent is accessed is "$T_i$, then the total time that the extent will remain in the cache memory 31 is $$T_i + \frac{S}{\left(\frac{M}{I}\right)} = T_i + \frac{SI}{M}.$$

Thus, the percentage of the "i-th" file in the cache memory 31 at any point in time (reference equation (2)) above corresponds to $$P_i = \frac{M_i\left(T_i + \frac{SI}{M}\right)}{SI}. \quad (18)$$

If the cache memory 31 is large, then $$M_i = \left(1 - \frac{P_i S}{E_i}\right)\frac{A_i}{R_i} \quad (19)$$

analogous to equations (3) and (11). From equations (1), (18) and (19)

$$1 = \sum_i P_i = \sum_i \frac{\left(1 - \frac{P_i S}{E_i}\right)\frac{A_i}{R_i}\left(T_i + \frac{SI}{M}\right)}{SI}. \quad (20)$$

Rearranging equaiton (20), $$1 = \sum_i P_i = \sum_i \frac{\left(\frac{A_i T_i}{R_i}\right)M + \left(\frac{A_i SI}{R_i}\right)}{\left(SI + \frac{SA_i T_i}{E_i R_i}\right)M + \left(\frac{A_i I}{E_i R_i}\right)S^{II}}, \quad (21)$$

which has a form similar to equations (7) and (14), and can be solved in a similar manner using a binary search technique. Using equations (14) and (17), an operator of the cache assessment system 10 can assess the effectiveness, if any, of increasing or decreasing the size of the cache memory 31 from its current size, based on the particular types of processing activities performed during the time interval over which the statistics $A_i$ and $E_i$ were collected. Thus, using equation (21), along with equations (10) and (17) (which define the effective range for "M," the number of cache misses) over a plurality of time intervals, during which the mixture of types of processing operations will likely change, the operator can determine the effectiveness, if any, of increasing or decreasing the size of the cache memory 31 for the diverse mixtures of processing operations which the digital data processing apparatus 14 may be called upon to perform.

As noted above, the second and third methodologies, described above in connection with equations 11 through 17 and 18 through 21, respectively, require values for variable $R_i$, $H(i,S)$ and $T_i$ to be determined over respective time intervals. Such values can be determined as follows. The value of $T_i$, the times between the first and last access to a cached extent in the cache memory 31, can be determined by providing a time stamp for each cache slot, which includes an initial value when an extent is assigned to the cache slot, and an access value that is updated each time the cache slot is accessed. In that case, when the cache slot is re-used for another extent, the value of $T_i$ for the previous extent will correspond to the difference between the access value and the initial value.

The reference average $R_i$, which indicates the average number of times a packet in a cache slot is accessed during each time interval, and $H(i,S)$, the number of cache hits per packet, can be determined by establishing respective tables having an entry associated with each packet, which are incremented when respective packet is accessed. When the cache slot is re-used for another extent, the number of times the extent was accessed while the packet was in the cache slot can be determined. The respective tables can, for example, have one entry for each extent, or, alternatively, may be in the form of a hash table having a plurality of entries which are hashed to identifiers for the extents in a conventional manner.

Figure 3:
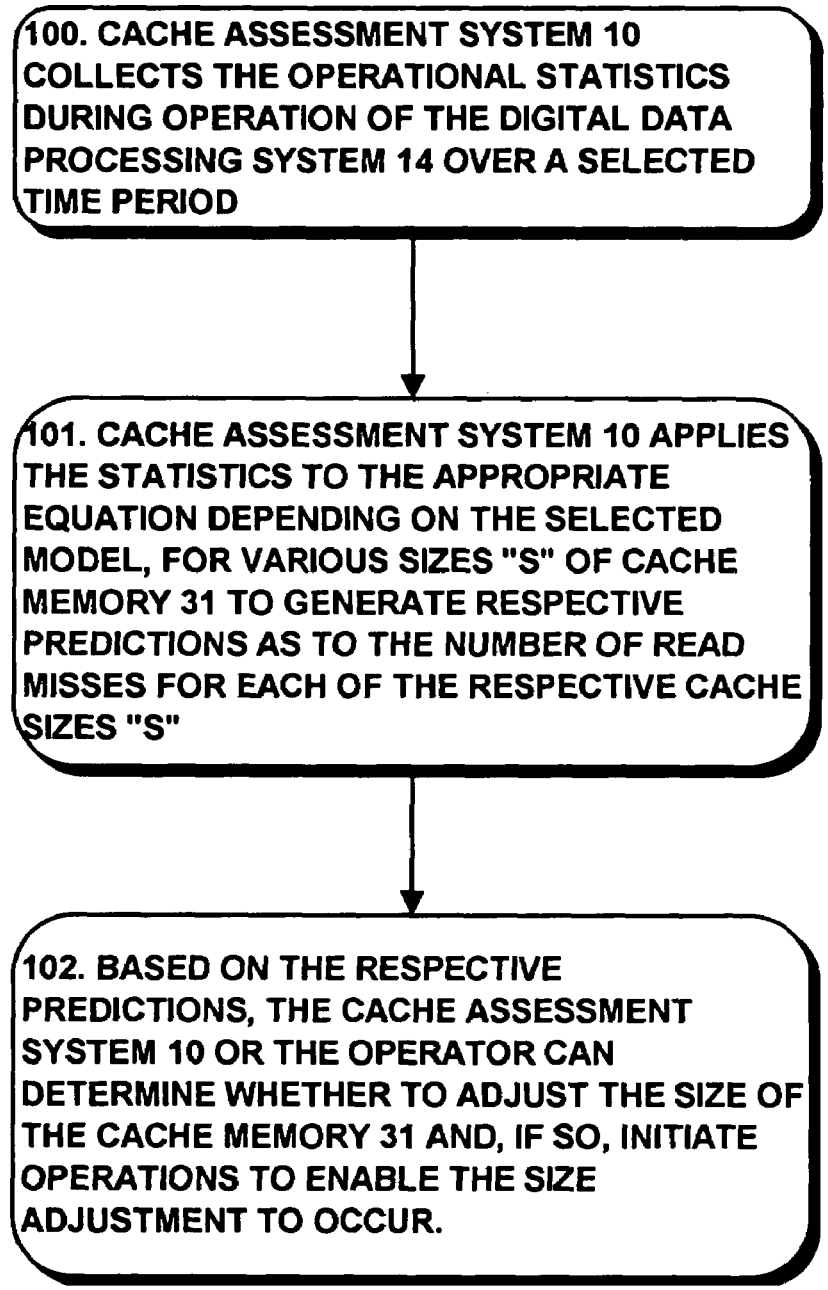
FIG. 3 is a flow diagram illustrating operations performed by the cache assessment system depicted in FIG. 1.

With this background operations performed by the cache assessment system 10 will be described in connection with the flowchart in FIG. 3. With reference to FIG. 3, the cache assessment system 10 initially collects the operational statistics during operation of the digital data processing system 14 over a selected time period (step 100). If the cache assessment system 10 uses the first model, described above in connection with equations 1 through 10, it need only collect the activity and extent statistics $A_i$ and $E_i$ described above. On the other hand, if the cache assessment system 10 uses the second model, it will additionally need to collect the re-reference and cache hit statistics $R_i$ and $H(i,S)$ over the time interval.

After the time interval has terminated, the cache assessment system 10 will apply the statistics to the appropriate equation (8) or (14), depending on the selected model, for various sizes "S" of cache memory 31 to generate respective predictions as to the number of read misses for each of the respective cache sizes "S" (step 101). Based on the respective predictions, the cache assessment system 10 or the operator can determine whether to adjust the size of the cache memory 31 (step 102) and, if so, initiate operations to enable the size adjustment to occur.

The invention provides a number of advantages. In particular, the invention provides a system and method for assessing the effect of read misses in connection with a cache memory used in a digital data processing system, as a function of the size of the cache memory, using statistics that are generated during processing operations of the digital data processing system. Based on the assessment, a determination can be made as to the utility of providing a cache memory of a particular size in the digital data processing system.

It will be appreciated that a number of modifications may be made to the cache assessment system 10 described above. For example, although the system 10 has been described in connection with a particular digital data processing system, it will be appreciated that the system 10 will find utility in connection with digital data processing systems of numerous architectures.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A system for generating an operational assessment of a cache memory in a digital data processing system for respective cache memory sizes comprising:
   A. an operational statistics gathering element configured to gather operational statistics over a time interval, including a file information retrieval activity value and an extent of activity value for each file accessed during the time interval;
   B. a cache miss prediction element configured to generate a cache miss prediction value in response to the operational statistics gathered by the operational statistics gathering element and a cache memory size value; and
   C. a cache memory size adjustment element configured to adjust the cache memory size in response to the cache miss prediction value generated by the cache miss prediction element for a selected one of said cache memory size values.

2. A system as defined in claim 1 in which the cache miss prediction element is configured to generate the cache miss prediction value based on a particular one of a plurality of cache memory management methodologies.

3. A system as defined in claim 2 in which one of said cache memory management methodologies is a FIFO (first-in/first-out) methodology, the cache miss prediction element being configured to generate the cache miss prediction value in accordance with:

$$1 = \sum_i \frac{A_i}{M + \frac{SA_i}{E_i}}$$

where "M" represents the cache miss prediction value, "S" represents the selected cache memory size value, "$A_i$" represents the file retrieval activity value for a file "i," and "$E_i$" represents the extent of activity value for the file "i."

4. A system as defined in claim 3 in which the cache miss prediction element is configured to determine the cache miss prediction value "M" using a binary search methodology over the interval $$0 \le M \le \sum_i A_i = A$$

where "A" represents the total activity over the time interval.

5. A system as defined in claim 2 in which one of said cache memory management methodologies is a FIFO (first-in/first-out) methodology, the operational statistics gathering element further being configured to gather a packet re-reference value indicating a number of times a portion of a file, identified as a packet, is referenced during the time interval, the cache miss prediction element generating the cache miss prediction value in accordance with:

$$1 = \sum_i \frac{\frac{A_i}{R_i}(R_i - 1 - H(i,S))}{M + \frac{S\left(\frac{A_i}{R_i}\right)}{E_i}}$$

where "M" represents the cache miss prediction value, H(i,S) corresponds to the number of cache hits per packet, "S" represents the selected cache memory size value, "$A_i$" represents the file retrieval activity value for a file "i," "$E_i$" represents the extent of activity value for the file "i," and "$R_i$" represents the packet re-reference value for file "i."

6. A system as defined in claim 5 in which the cache miss prediction element is further configured to determine the cache miss prediction value "M" using a binary search methodology over the interval $$0 \le M \le \sum_i A_i = A$$

where "A" represents the total activity over the time interval.

7. A system as defined in claim 2 in which one of said cache memory management methodologies is an LRU (least-recently used) methodology, the operational statistics gathering element being further configured to gather a packet re-reference value indicating a number of times a portion of a file, identified as a packet, is referenced during the time interval, the cache miss prediction element being configured to generate the cache miss prediction value in accordance with:

$$1 = \sum_i \frac{\left(\frac{A_i T_i}{R_i}\right)M + \left(\frac{A_i SI}{R_i}\right)}{\left(SI + \frac{SA_i T_i}{E_i R_i}\right)M + \left(\frac{A_i I}{E_i R_i}\right)S^2}$$

where "M" represents the cache miss prediction value, H(i,S) corresponds to the number of cache hits per packet, "S" represents the selected cache memory size value, "$A_i$" represents the file retrieval activity value for a file "i," "$E_i$" represents the extent of activity value for the file "i," "$R_i$" represents the packet re-reference value for file "i," and "I" represents the duration of the time interval.

8. A system as defined in claim 7 in which the cache miss prediction element is further configured to determine the cache miss prediction value "M" using a binary search methodology over the interval $$0 \le M \le \sum_i A_i = A$$

where "A" represents the total activity over the time interval.

9. A method for generating an operational assessment of a cache memory in a digital data processing system for respective cache memory sizes comprising the steps of:

A. gathering operational statistics over a time interval, including a file information retrieval activity value and an extent of activity value for each file accessed during the time interval;

B. generating a cache miss prediction value in response to the operational statistics gathered during the operational statistics gathering step, and a cache memory size value; and C. adjusting the cache memory size in response to the cache memory size value generated during the cache miss prediction step for a selected one of said cache miss prediction values.

10. A method as defined in claim 9 in which during the cache miss prediction step the cache miss prediction value based on a particular one of a plurality of cache memory management methodologies.

11. A method as defined in claim 10 in which one of said cache memory management methodologies is a FIFO (first-in/first-out) methodology, during the cache miss prediction step the cache miss prediction value being generated in accordance with:

$$1 = \sum_i \frac{A_i}{M + \frac{SA_i}{E_i}}$$

where "M" represents the cache miss prediction value, "S" represents the selected cache memory size value, "$A_i$" represents the file retrieval activity value for a file "i," and "$E_i$" represents the extent of activity value for the file "i."

12. A method as defined in claim 11 in which, during the cache miss prediction step, the cache miss prediction value "M" being generated using a binary search methodology over the interval $$0 \le M \le \sum_i A_i = A$$

where "A" represents the total activity over the time interval.

13. A method as defined in claim 10 in which one of said cache memory management methodologies is a FIFO (first-in/first-out) methodology, the operational statistics gathering element further gathering a packet re-reference value indicating a number of times a portion of a file, identified as a packet, is referenced during the time interval, during the cache miss prediction step the cache miss prediction value being generated in accordance with:

$$1 = \sum_i \frac{\frac{A_i}{R_i}(R_i - 1 - H(i, S))}{M + \frac{S\left(\frac{A_i}{R_i}\right)}{E_i}}$$

where "M" represents the cache miss prediction value, H(i,S) corresponds to the number of cache hits per packet, "S" represents the selected cache memory size value, "$A_i$" represents the file retrieval activity value for a file "i," "$E_i$" represents the extent of activity value for the file "i," and "$R_i$" represents the packet re-reference value for file "i."

14. A method as defined in claim 13 in which, during cache miss prediction step, the cache miss prediction value "M" being generated using a binary search methodology over the interval $$0 \le M \le \sum_i A_i = A$$

where "A" represents the total activity over the time interval.

15. A method as defined in claim 10 in which one of said cache memory management methodologies is an LRU (least-recently used) methodology, during the operational statistics gathering step a packet re-reference value being further gathered indicating a number of times a portion of a file, identified as a packet, is referenced during the time interval, the cache miss prediction element generating the cache miss prediction value in accordance with:

$$1 = \sum_i \frac{\left(\frac{A_i T_i}{R_i}\right)M + \left(\frac{A_i SI}{R_i}\right)}{\left(SI + \frac{SA_i T_i}{E_i R_i}\right)M + \left(\frac{A_i I}{E_i R_i}\right)S^2}$$

where "M" represents the cache miss prediction value, H(i,S) corresponds to the number of cache hits per packet, "S" represents the selected cache memory size value, "$A_i$" represents the file retrieval activity value for a file "i," "$E_i$" represents the extent of activity value for the file "i," "$R_i$" represents the packet re-reference value for file "i," and "I" represents the duration of the time interval.

16. A method as defined in claim 15 in which during the cache miss prediction step the cache miss prediction value "M" being generated using a binary search methodology over the interval $$0 \le M \le \sum_i A_i = A$$

where "A" represents the total activity over the time interval.

17. A computer program product embodied upon a computer readable medium for use in connection with a computer to generate an operational assessment of a cache memory in a digital data processing system for respective cache memory sizes values, the computer program product comprising a cache miss prediction module configured to enable said computer to generate a cache miss prediction value in response to operational statistics gathered over a time interval, including a file information retrieval activity value and an extent of activity value for each file accessed during the time interval, and a cache memory size value; and a cache memory size adjustment module configured to adjust the cache memory size in response to the cache miss prediction value generated by the cache miss prediction module for a selected one of said cache memory size values.

18. A computer program product as defined in claim 17 in which the cache miss prediction module is configured to enable said computer to generate the cache miss prediction value based on a particular one of a plurality of cache memory management methodologies.

19. A computer program product as defined in claim 18 in which one of said cache memory management methodologies is a FIFO (first-in/first-out) methodology, the cache miss prediction module being configured to generate the cache miss prediction value in accordance with:

$$1 = \sum_i \frac{A_i}{M + \frac{SA_i}{E_i}}$$

where "M" represents the cache miss prediction value, "S" represents the selected cache memory size value, "Ai" represents the file retrieval activity value for a file "i," and "Ei" represents the extent of activity value for the file "i."

20. A computer program product as defined in claim 19 in which the cache miss prediction module is configured to determine the cache miss prediction value "M" using a binary search methodology over the interval $$0 \le M \le \sum_i A_i = A$$

where "A" represents the total activity over the time interval.

21. A computer program product as defined in claim 18 in which one of said cache memory management methodologies is a FIFO (first-in/first-out) methodology, the cache miss prediction module being further configured to generate the cache miss prediction value in accordance with:

$$1 = \sum_i \frac{\frac{A_i}{R_i}(R_i - 1 - H(i, S))}{M + \frac{S\left(\frac{A_i}{R_i}\right)}{E_i}}$$

where "M" represents the cache miss prediction value, H(i,S) corresponds to a number of cache hits per packet, "S" represents the selected cache memory size value, "$A_i$," represents the file retrieval activity value for a file "i," "$E_i$," represents the extent of activity value for the file "i," and "$R_i$" represents a packet re-reference value indicating a number of times a portion of a file, identified as a packet "i," is referenced during the time interval.

22. A computer program product as defined in claim 21 in which the cache miss prediction module is configured to enable said computer to determine the cache miss prediction value "M" using a binary search methodology over the interval $$0 \le M \le \sum_i A_i = A$$

where "A" represents the total activity over the time interval.

23. A computer program product as defined in claim 18 in which one of said cache memory management methodologies is an LRU (least-recently used) methodology, the cache miss prediction module being further configured to enable the computer to generate the cache miss prediction value in accordance with:

$$1 = \sum_i \frac{\left(\frac{A_i T_i}{R_i}\right) M + \left(\frac{A_i SI}{R_i}\right)}{\left(SI + \frac{SA_i T_i}{E_i R_i}\right) M + \left(\frac{A_i I}{E_i R_i}\right) S^2}$$

where "M" represents the cache miss prediction value, H(i,S) corresponds to the number of cache hits per packet, "S" represents the selected cache memory size value, "Ai" represents the file retrieval activity value for a file "i," "Ei" represents the extent of activity value for the file "i," "Ri" represents a packet re-reference value indicating a number of times a portion of a file, identified as a packet "i," is referenced during the time interval, and "I" represents the duration of the time interval.

24. A computer program product as defined in claim 23 in which the cache miss prediction module is configured to enable said computer to determine the cache miss prediction value "M" using a binary search methodology over the interval $$0 \le M \le \sum_i A_i = A$$

where "A" represents the total activity over the time interval.

* * * * *